US009435297B2

(12) United States Patent
Shimizu (10) Patent No.: US 9,435,297 B2
(45) Date of Patent: Sep. 6, 2016

(54) EGR DEVICE FOR INTERNAL COMBUSTION ENGINE

(75) Inventor: Atsushi Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 39 days.

(21) Appl. No.: 14/124,152

(22) PCT Filed: Jul. 12, 2012

(86) PCT No.: PCT/JP2012/067788
§ 371 (c)(1),
(2), (4) Date: Jan. 27, 2014

(87) PCT Pub. No.: WO2013/021779
PCT Pub. Date: Feb. 14, 2013

(65) Prior Publication Data
US 2014/0144415 A1  May 29, 2014

(30) Foreign Application Priority Data

Aug. 10, 2011  (JP) .................................. 2011-175101

(51) Int. Cl.
| F02F 1/42 | (2006.01) |
| F02M 25/07 | (2006.01) |
| F02M 35/10 | (2006.01) |

(52) U.S. Cl.
CPC ............ *F02M 25/0771* (2013.01); *F02F 1/42* (2013.01); *F02M 26/73* (2016.02); *F02M 35/10222* (2013.01); *Y02T 10/121* (2013.01)

(58) Field of Classification Search
CPC .............. F02M 25/0771; F02M 25/0772; F02M 25/0787; F02F 1/42; F02F 1/4264; F02F 1/4285
See application file for complete search history.

(56) References Cited

U.S. PATENT DOCUMENTS

| 4,672,939 A | * | 6/1987 | Yokoi et al. ............. 123/568.17 |
| 8,011,352 B2 | * | 9/2011 | Shinkai et al. ........ F02M 26/20 |
| | | | 123/568.17 |

FOREIGN PATENT DOCUMENTS

| JP | 4-47155 A | 2/1992 | |
| JP | 04047155 A | * 2/1992 | ............. F02M 25/07 |
| JP | 7-180616 A | 7/1995 | |
| JP | 7-180618 A | 7/1995 | |
| JP | 09-088728 A | 3/1997 | |
| JP | 3424720 B2 | 7/2003 | |
| JP | 2009-162197 A | 7/2009 | |
| JP | 2010-65609 A | 3/2010 | |
| JP | 2011-111938 A | 6/2011 | |

OTHER PUBLICATIONS

International Search Report dated Sep. 25, 2012 issued in corresponding application No. PCT/JP2012/067788.
Office Action dated Mar. 24, 2015, issued in corresponding Japanese Application No. 2013-527940. (2 pages).

* cited by examiner

*Primary Examiner* — Lindsay Low
*Assistant Examiner* — Kevin Lathers
(74) *Attorney, Agent, or Firm* — Westerman, Hattori, Daniels & Adrian, LLP (57) ABSTRACT

An EGR device for an internal combustion engine comprises: an EGR path through which a part of exhaust gas is recirculated from the exhaust gas conduit of an internal combustion engine as EGR gas to the intake path; and an EGR valve that is disposed within the EGR path and adjusts the flow rate of the EGR gas flowing through the EGR path. An curved structure EGR path from a position at which the EGR valve is disposed until a joining section (8*d*) merging with an intake manifold is a curved structure having a turned-back section which is curved in a cross-sectional view cutting a plane parallel to an installation plane on which the internal combustion engine is mounted. The position at which the EGR valve is disposed is higher than the joining section, and the EGR path of the curved structure slopes downward from the EGR valve side.

5 Claims, 4 Drawing Sheets

EGR DEVICE FOR INTERNAL COMBUSTION ENGINE

TECHNICAL FIELD

The present invention relates to an EGR device for an internal combustion engine that recirculates a portion of exhaust gas from the exhaust path of the internal combustion engine to the intake path.

BACKGROUND ART

Conventionally, an EGR device that recirculates a portion of exhaust gas from the exhaust path of the internal combustion engine to the intake path as EGR gas has been provided to internal combustion engines. An EGR valve that adjusts the flow rate of EGR gas flowing inside of an EGR path is arranged midstream of the EGR path in which the EGR gas flows in the EGR device.

If this EGR valve is arranged in the vicinity of the intake path, which is the outlet of the EGR path, blow-by oil having flowed through the intake path may enter inside the EGR path, adhere to the EGR valve, and the valve function may no longer be able to be exhibited.

As technology addressing such a problem, the technology described in Patent Document 1 provides a curved part (hereinafter referred to as "oil collector") at a position closer than the position of the EGR valve, by way of the EGR path sloping downwards as distancing from the EGR valve, and subsequently sloping upwards towards a surge tank. According to this technology of Patent Document 1, if the blow-by oil in the form of a mist in the blow-by gas returned to the surge tank enters the EGR path, it will drip downwards along the inner wall surface of the EGR path, and collect in the oil collector at the lowest part. Adherence of the blow-by oil to the EGR valve is thereby prevented, whereby the matter of the EGR valve not being able to exhibit a valve function is prevented.

[Patent Document 1] Japanese Patent No. 3424720

DISCLOSURE OF THE INVENTION

Problems to be Solved by the Invention

With the technology described in Patent Document 1, since the oil collector is provided between the EGR valve inside of the EGR path and a joining section at which the EGR path merges to the intake path, the blow-by oil entering the EGR path will collect, as well as condensed water generated inside of the EGR path particularly during engine startup collecting, and the condensed water existing in the intake path will enter the EGR path and collect. Then, the blow-by oil and condensed water having collected in the oil collector will flow back according to the pulses of EGR gas, and reach the EGR valve. The blow-by oil and condensed water having reached the EGR valve will stagnate for a long time in the EGR valve.

In a case of carbon of the exhaust gas components adhering and mixing with the blow-by oil stagnating in the EGR valve, since it will change to tar and form a solid, an operational malfunction will occur by the EGR valve sticking, and the EGR valve will no longer be able to exhibit a valve function.

In addition, in the case of condensed water having stagnated in the EGR valve, since the condensed water is acidic by the influence of exhaust gas components, corrosion will occur in the EGR valve, and failure will occur in the EGR valve. When trying to avoid this corrosion, the necessity to use high cost components such as of stainless steel arises.

Furthermore, since the EGR valve is arranged lower than the joining section at which the EGR path merges to the intake path, there is a possibility of condensed water existing on the intake path side flowing into the EGR valve during engine stop.

The present invention takes the above-mentioned issues into account, and has an object of providing an EGR device for an internal combustion engine capable of protecting the EGR valve from blow-by oil and condensed water.

Means for Solving the Problems

The present invention provides an EGR device (e.g., the EGR device 5 described later) for an internal combustion engine, comprising: an EGR path (e.g., the EGR path 6 described later) that causes a portion of exhaust gas to recirculate from an exhaust path of the internal combustion engine to an intake path as EGR gas; and an EGR valve (e.g., the EGR valve 9 described later) that is disposed within the EGR path and adjusts a flow rate of the EGR gas flowing through the EGR path, in which an EGR path (e.g., the curved structure EGR path 8 described later) from a position at which the EGR valve is disposed until a joining section (e.g., the joining section 8*d* described later) merging with the intake path (e.g., the intake manifold 3 described later) is a curved structure having a turned-back section (e.g., the turned-back section 8*b* described later) that is curved in a cross-sectional view cutting a plane parallel to an installation plane on which the internal combustion engine is installed, and the position at which the EGR valve is disposed is higher than the joining section, and the EGR path of the curved structure slopes downwards from a side of the EGR valve towards a side of the joining section.

According to the present invention, the EGR path of the curved structure is provided between the position at which the EGR valve is provided and the joining section merging with the intake path, and this curved section has the turned-back section that is curved in a cross-sectional view cutting a plane parallel to the installation plane on which the internal combustion engine is installed. In addition, the EGR path of the curved structure slopes downwards from the EGR valve side towards the joining section side.

Since the path length is thereby lengthened by the curved structure and the EGR path of the curved structure slopes downwards to the joining section side, blow-by oil entering the EGR path from the intake path does not easily reach the EGR valve, and is returned to the intake path along the slope of the EGR path of the curved structure. In addition, also in the case of blow-by oil of mist form flying from the intake path and entering the EGR path, due to lengthening the path length by the curved structure and the curved structure having the turned-back section that is curved in a cross-sectional view cutting a plane parallel to the installation plane on which the internal combustion engine is installed, blow-by oil of mist form collides with the inside diameter side inner wall surface of the turned-back section of the curved structure without being able to directly fly into the EGR valve, and does not reach the EGR valve.

In addition, similarly also for condensed water, since the path length is lengthened by the curved structure, and the EGR path of the curved structure slopes downwards to the joining section side, the condensed water entering the EGR path from the intake path is returned to the intake path along the slope. In addition, the condensed water generated inside of the EGR path during engine startup in particular is discharged to the intake path along the slope.

In addition, conversely in the case of the blow-by oil and condensed water having reached the EGR valve, since the EGR path of the curved structure slopes downwards from a position at which the EGR valve is provided towards the joining section side, the blow-by oil and condensed water having reached the EGR valve is discharged to the intake path along the slope of the EGR path of the curved structure.

As stated above, the EGR valve can be protected from blow-by oil and condensed water.

Moreover, by establishing the EGR path of the curved structure, it is possible to ensure the path length necessary until the EGR valve even in a limited space. For this reason, even if space is limited, it is possible to adequately avoid the blow-by oil and condensed water entering the EGR path from the intake path from reaching the EGR valve.

It is preferable for a portion of the EGR path on an upstream side connecting with the EGR path of the curved structure to be configured as a head-internal EGR path (e.g., the head-internal EGR path 7 described later) that passes through the inside of a cylinder head of the internal combustion engine.

According to the present invention, since the cylinder head is being cooled, the EGR gas passing through the head-internal EGR path is cooled, and thus a large amount of condensed water is generated. Even in this case, since the EGR path of the curved structure slopes downwards from a position at which the EGR valve is provided towards the joining section side, a large amount of the condensed water having reached the EGR valve is discharged to the intake path along the slope of the EGR path of the curved structure.

In addition, if providing the head-internal EGR path, the overall EGR path will be compact, and ensuring the path length required between the position at which the EGR valve is provided and the joining section merging to the intake path will be difficult. Even in this case, by providing the EGR path of the curved structure, it is possible to adequately ensure a path length for which blow-by oil and condensed water entering the EGR path from the intake path will not reach the EGR valve.

It is preferable for the EGR path of the curved structure not to exceed an edge line of the internal combustion engine, and a length of a center line of the EGR path of the curved structure to be at least 135 mm.

According to the present invention, since the EGR path of the curved structure does not exceed the edge line of the internal combustion engine, the path length required until the EGR valve is ensured, while the installation space of the internal combustion engine does not increase in size.

Moreover, by the length of the center line of the EGR path of the curved structure being at least 135 mm, it is possible to ensure the path length required until the EGR valve. For this reason, it is possible to adequately avoid the blow-by oil and condensed water entering the EGR path from the intake path from reaching the EGR valve.

It is preferable for the EGR path of the curved structure to be S-shaped in a cross-sectional view cutting a plane parallel to an installation plane on which the internal combustion engine is installed.

According to the present invention, it is possible to establish the EGR path of the curved structure EGR path that is efficient in manufacture due to the relationship of the molding dies that remove a core, and is efficient upon forming the turned-back section while achieving a path length.

It is preferable for the EGR path of the curved structure and an upstream-side intake path (e.g., the upstream-side intake path 10 described later) extending from above an upstream side of the EGR path of the curved structure towards the joining section to merge at an acute angle at the joining section.

According to the present invention, since the EGR path of the curved structure and upstream-side intake path merge at an acute angle, the blow-by oil entering the EGR path from the upstream-side intake path, if riding the flow of intake air, will not easily enter the EGR path of the curved structure towards a substantially opposite direction to the flow of intake air. For this reason, it is possible to suppress blow-by oil from the upstream-side intake path from entering the EGR path of the curved structure.

It is preferable for an embankment section (e.g., the embankment section 11 described later) that projects inwards and prevents blow-by oil from following an inner wall face from the upstream-side intake path and flowing into the EGR path of the curved structure to be provided at an inner wall face of the joining section.

According to the present invention, it is possible to prevent blow-by oil from following the inner wall face from the intake path on the upstream side of the joining section and flowing into the EGR path of the curved structure. For this reason, the blow-by oil from the upstream-side intake path can be suppressed from entering the EGR path of the curved structure.

EXPLANATION OF REFERENCE NUMERALS 1 internal combustion engine
2a to 2d cylinder
3 intake manifold (intake path)
3a inlet
4 exhaust manifold
5 EGR device
6 EGR path
7 head-internal EGR path
8 curved structure EGR path (EGR path of curved structure)
8a linear section
8b turned-back section
8b1 inside diameter side inner wall face
8c slight-bend section
8d joining section 9 EGR valve
10 upstream-side intake path
11 embankment section
12 linking section

PREFERRED MODE FOR CARRYING OUT
THE INVENTION

Hereinafter, an embodiment of the present invention will be explained while referencing the drawings.

Figure 1:
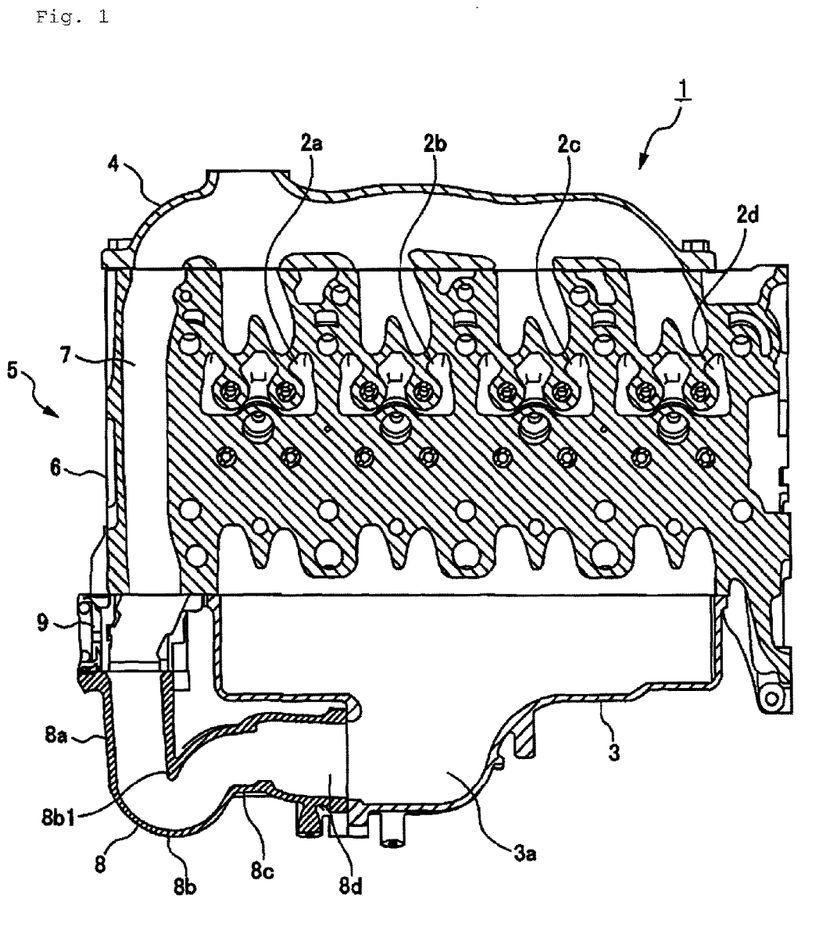
FIG. 1 is a transverse section viewing an internal combustion engine equipped with an EGR device according to an embodiment of the present invention from above.

FIG. 1 is a transverse section viewing an internal combustion engine 1 equipped with an EGR device 5 according to the embodiment of the present invention from above. In detail, FIG. 1 is a drawing viewing a cross section cutting a plane parallel to a mounting surface on which the internal combustion engine 1 is mounted from above. The internal combustion engine 1 shown in FIG. 1 is a diesel internal combustion engine having four cylinders 2a to 2d. The internal combustion engine 1 performs combustion by intake air flowing in from the intake path being supplied and fuel being injected to the intake air inside of the cylinders 2a to 2d, and exhaust gas discharged from the internal combustion engine 1 is made to flow out to the exhaust path.

The intake path and exhaust path are connected to the internal combustion engine 1. The intake path has an intake manifold 3 at a connecting part with the internal combustion engine 1 as shown in FIG. 1. On the other hand, the exhaust path has an exhaust manifold 4 at a connecting part with the internal combustion engine 1 as shown in FIG. 1.

This internal combustion engine 1 is provided with the EGR device 5 that causes a portion of the exhaust gas discharged from the internal combustion engine 1 to recirculate from the intake system to the internal combustion engine 1 as EGR gas.

The EGR device 5 has an EGR path 6 that is connected to the intake manifold 3 from the exhaust manifold 4.

The EGR path 6 is configured from a head-internal EGR path 7 of an upstream side that extends from the exhaust manifold 4, and a curved structure EGR path 8 that is connected to the downstream side of the head-internal EGR path 7. It should be noted that the EGR path 6 is provided so as to substantially maintain a predetermined internal diameter, despite the path cross-sectional shape varying depending on the respective configurations.

In addition, an EGR valve 9 is included midstream of the EGR path 6 that adjusts the flow rate of EGR gas flowing through the EGR path 6. The EGR valve 9 is arranged between the head-internal EGR path 7 and the curved structure EGR path 8, and is mounted to an intake manifold 3 side lateral face of the internal combustion engine 1. The EGR valve 9 adjusts the flow rate of EGR gas flowing through the EGR path 6 by varying the path cross-sectional area of the EGR path 6 according to the command, etc. of an ECU.

The head-internal EGR path 7 is a path of tunnel form provided to penetrate from the exhaust manifold 4 side to the intake manifold 3 side in an end region of the cylinder head of the internal combustion engine 1, as shown in FIG. 1.

Herein, the cylinder head of the internal combustion engine 1 is cooled by coolant circulating therein. For this reason, the EGR gas flowing though the head-internal EGR path 7 is cooled by the cylinder head of the internal combustion engine 1. Consequently, the EGR device 5 of the present embodiment is a configuration not provided with a separate EGR cooler.

The curved structure EGR path 8 extends from the EGR valve 9 mounted to the intake manifold 3 side lateral face of the internal combustion engine 1 as shown in FIG. 1, and merges with an inlet 3a of the intake manifold 3.

The curved structure EGR path 8 more specifically first has a linear section 8a that extends straight from the EGR valve 9 in an outwards direction of the internal combustion engine 1. At a leading end of the linear section 8a, a turned-back section 8b is provided that curves to turn back in a cross-sectional view cutting a plane parallel to the installation plane on which the internal combustion engine 1 is installed (hereinafter referred to as "lateral cross-sectional view"). The turned-back section 8b is a section in which the EGR path 6 bends in a substantial U-shape in the lateral cross-sectional view. The turned-back section 8b is connected to a slight-bend section 8c at a connecting end on an opposite side to the linear section 8a. The slight-bend section 8c gently bends to connect the turned-back section 8b with the joining section 8d at which the EGR path merges with the inlet of the intake manifold 3. The slight-bend section 8c is connected to the joining section 8d at a connecting end on an opposite side to the turned-back section 8b. The joining section 8d is a portion at which an upstream-side intake path 10 and the curved structure EGR path 8 merge, merging at the inlet 3a of the intake manifold 3.

The curved structure EGR path 8 configured by the linear section 8a, turned-back section 8b, slight-bend section 8c and joining section 8d in this way makes an S-shaped curved structure having the turned-back section 8b that is curved in a lateral cross-sectional view as a whole.

Figure 2:
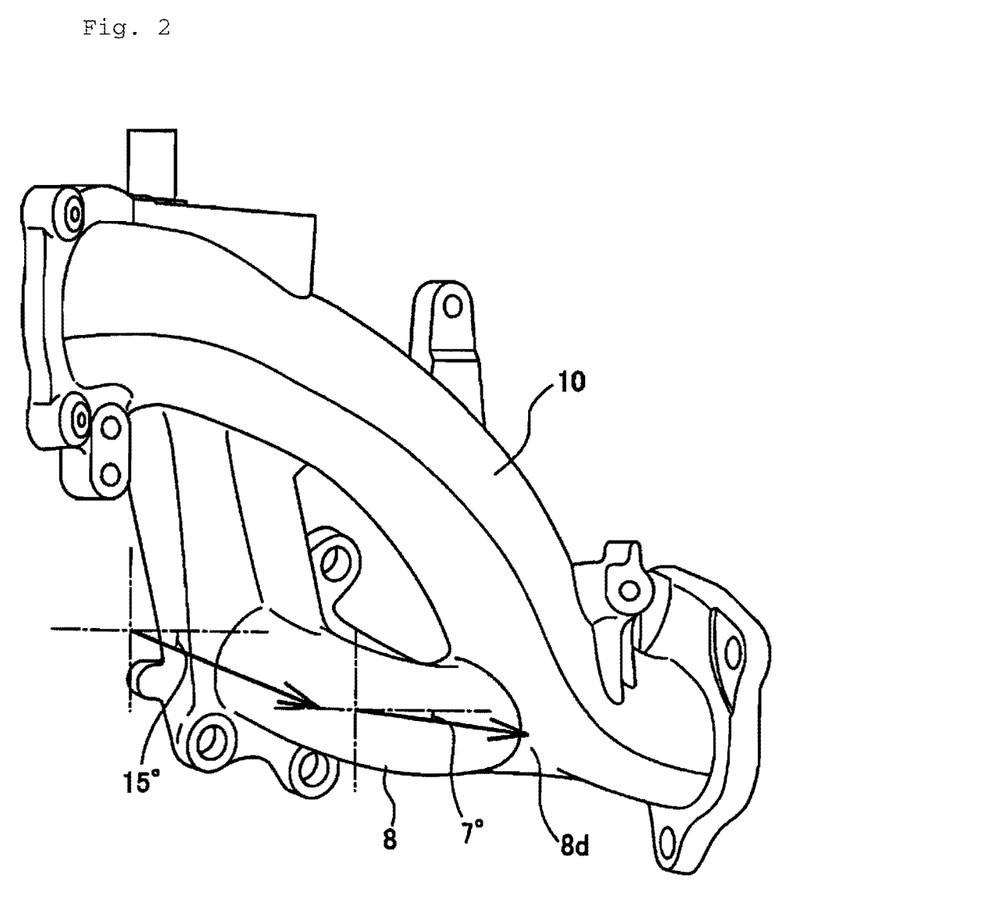
FIG. 2 is a general perspective view of a curved structure EGR path and upstream-side intake path according to the embodiment of the present invention.

FIG. 2 is a general perspective view of the curved structured EGR path 8 and upstream-side intake path 10 according to the embodiment of the present invention.

The position at which the EGR valve 9 is provided positioned higher than the joining section 8d. Then, the curved structure EGR path 8 slopes downwards from the EGR valve 9 side towards the joining section 8d side. More specifically, as shown in FIG. 2, the internal combustion engine 1 slopes downwards 15° to the intake manifold 3 side, and the curved structure EGR path 8 slopes downwards 7° from the EGR valve 9 side to the joining section 8d side. In other words, the curved structure EGR path 8 slopes gently downwards from the EGR valve 9 side to the joining section 8d side.

In addition, as shown in FIG. 2, above this curved structure EGR path 8, the upstream-side intake path 10 is considered so as to extend in an oblique downward direction from above the upstream side of the curved structure EGR path 8 towards the joining section 8d to connect to the joining section 8d, and to merge at the inlet 3a of the intake manifold 3.

In other words, the curved structure EGR path 8 and upstream-side intake path 10 merge at an acute angle in the joining section 8d.

Figure 3:
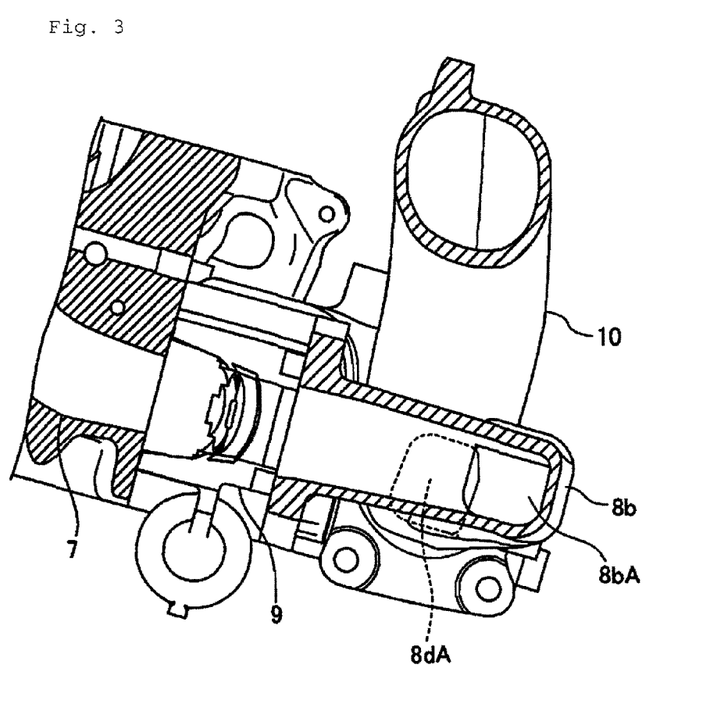
FIG. 3 is a longitudinal section of the curved structure EGR path according to the embodiment of the present invention.

FIG. 3 is a longitudinal section of the curved structure EGR path 8 according to the embodiment of the present invention. In more detail, FIG. 3 is a cross-sectional view sectioning the linear section 8a in a vertical direction orthogonal to the installation plane on which the internal combustion engine 1 is installed. As shown in FIG. 3, an aperture position 8bA of the turned-back section 8b and an aperture position 8dA of the joining section 8d shown by the dotted line are configured so as not to overlap when viewed from a side. Consequently, when viewing from the joining section 8d, an inner diameter side inner wall surface 8b1 of the turned-back section 8b stands in the way between the linear section 8a as shown in FIG. 1.

Figure 4:
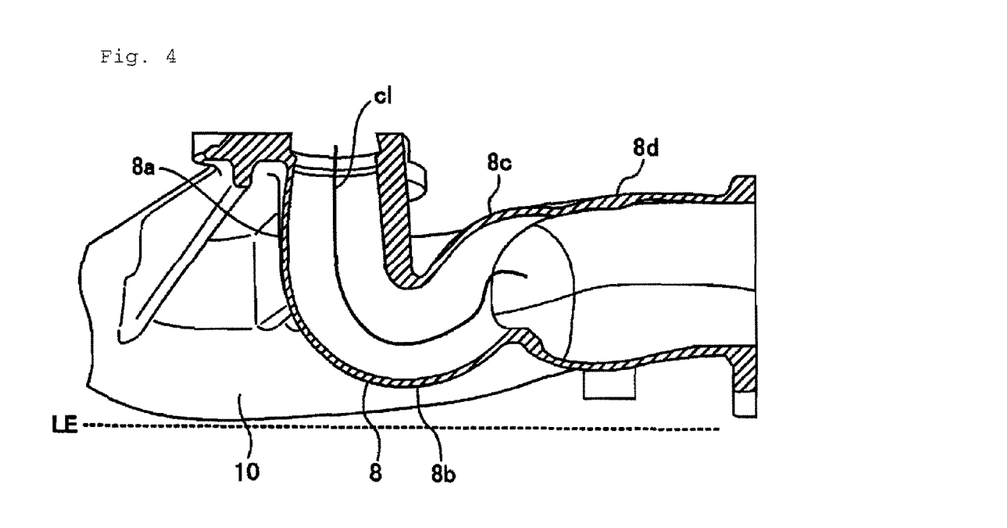
FIG. 4 is a transverse section viewing the curved structure EGR path according to the embodiment of the present invention from below.

FIG. 4 is a transverse section viewing the curved structure EGR path 8 according to the embodiment of the present invention from below.

As shown in FIG. 4, in the curved structure EGR path 8, the outside outer wall face of the turned-back section 8b does not exceed an edge line LE of the internal combustion engine 1 illustrated. Herein, the edge line LE is a line defined by other components and the internal combustion engine 1 itself. The edge line LE of the present embodiment is an edge line defined by the upstream-side intake path 10 as the other component.

In addition, the length cl of a center line of the curved structure EGR path 8 as shown in FIG. 4 is set to at least 135 mm.

Figure 5:
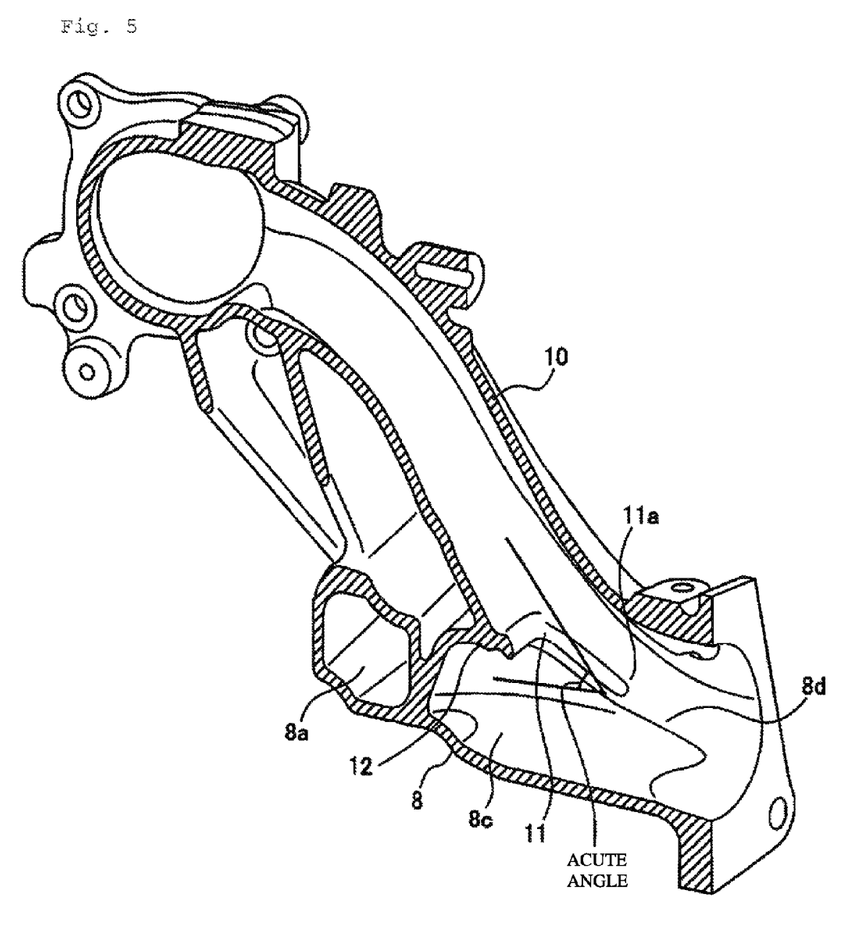
FIG. 5 is a longitudinal section of the curved structure EGR path and an upstream-side intake path according to the embodiment of the present invention.

FIG. 5 is a longitudinal section of the curved structure EGR path 8 and upstream-side intake path 10 according to the embodiment of the present invention.

As shown in FIG. 5, the curved structure EGR path 8 with a gentle slope and the upstream-side intake path 10 hanging down at a steep slope from the upper part merge at an acute angle in the joining section 8d. For this reason, the flow of intake air in the upstream-side intake path 10 and the flow of EGR gas in the curved structure EGR path 8 merge at an acute angle and flow in substantially the same direction without impinging, and thus are configured so as to flow into the intake manifold 3 smoothly.

In addition, as shown in FIG. 5, an embankment section 11 that projects inwards and prevents blow-by oil, condensed water, etc. from following the inner wall face from the upstream-side intake path 10 of the joining section 8d and flowing into the curved structure EGR path 8 is provided at the inner wall face of the joining section 8d.

The embankment section 11 is formed directly above a linking section 12 at which the upstream-side intake path 10 and the curved structure EGR path 8 link in the joining section 8d until an end part 11a on the intake manifold 3 side that reaches the inner circumferential face of a side of a portion at which the upstream-side intake path 10 and the curved structure EGR path 8 meet at the joining section 8d. The embankment section 11 is formed to slope downwards from directly above the linking section 12 towards the end part 11a, so as to cause blow-by oil, condensed water, etc. to ride along this embankment section 11 to move to the end part 11a. In addition, the height of the embankment section 11 may be high on the directly above side of the linking section 12 and lower more towards the end part 11a side.

It should be noted that, although the embankment section 11 is not limited to this shape, the effect of preventing blow-by oil, condensed water, etc. from flowing into the curved structure EGR path 8 is greater as formed closer to the linking section 12 at which the upstream-side intake path 10 and curved structure EGR path 8 are linked.

In the EGR device 5 including the above configuration, EGR gas that is a portion of the exhaust gas discharged from the internal combustion engine 1 is made to flow into the head-internal EGR path 7 from the exhaust manifold 4, and adjusting the flow rate of the EGR gas with the EGR valve 9, is made to recirculate to the intake manifold 3 by flowing through the curved structure EGR path 8.

According to the EGR device 5, the following effects are thereby exerted.

In other words, according to the EGR device 5, the curved structure EGR path 8 is provided between the position at which the EGR valve 9 is provided and the joining section 8d that joins to the inlet 3a of the intake manifold 3, and the curved structure of the curved structure EGR path 8 has the turned-back section 8b, which is curved in a lateral cross-sectional view. In addition, the curved structure EGR path 8 slopes downwards from the EGR valve 9 side towards the joining section 8d side.

Since the path length is thereby lengthened by the curved structure of the curved structure EGR path 8, and the curved structure EGR path 8 slopes downwards to the joining section 8d side, the blow-by oil entering the curved structure EGR path 8 from the upstream-side intake path 10 does not easily reach the EGR valve 9, and returns to the intake manifold 3 along the slope of the curved structure EGR path 8. In addition, also in a case of blow-by oil of mist form flying from the upstream-side intake path 10 and entering the curved structure EGR path 8, due to lengthening the path length by the curved structure of the curved structure EGR path 8, and having the turned-back structure 8b in which the curved structure of the curved structure EGR path 8 curves in a lateral cross-sectional view, the blow-by oil of mist form cannot directly fly into the EGR valve 9 from the aperture position 8dA of the joining section 8d shown by the dotted line as shown in FIG. 3 towards the aperture position 8bA of the turned-back section 8d, and thus collides with the inside diameter side inner wall face 8b1 of the turned-back section 8b of the curved structure as shown in FIG. 1, and does not reach the EGR valve 9.

In addition, similarly for the condensed water, due to the path length being lengthened by the curved structure of the curved structure EGR path 8 and the curved structure EGR path 8 sloping downwards to the joining section side, the condensed water entering the curved structure EGR path 8 from the upstream-side intake path 10 is returned to the intake manifold 3 along the slope. Moreover, the condensed water generated inside of the EGR path 6 during engine startup in particular is also discharged to the intake manifold 3 along the slope of the curved structure EGR path 8.

In addition, conversely in the case of the blow-by oil and condensed water having reached the EGR valve 9, since the curved structure EGR path 8 slopes downwards from a position at which the EGR valve 9 is provided to the joining section 8d side, the blow-by oil and condensed water having reached the EGR valve 9 is discharged to the intake manifold 3 along the slope of the curved structure EGR path 8.

Due to the above, the EGR valve 9 can be protected from blow-by oil and condensed water. In addition, conversely in the case of the blow-by oil and condensed water having reached the EGR valve 9, it is possible to cause the blow-by oil and condensed water having arrived at the EGR valve 9 to discharge from the EGR valve 9.

Moreover, by establishing the curved structure EGR path 8, it is possible to ensure the path length necessary until the EGR valve 9 even in a limited space. For this reason, even if space is limited, it is possible to adequately avoid the blow-by oil and condensed water entering the curved structure EGR path 8 from the upstream-side intake path 10 from reaching the EGR valve 9.

In addition, the EGR device 5 has the head-internal EGR path 7 as shown in FIG. 1, and thus the EGR gas passing through the head-internal EGR path 7 is cooled by the cooling of the cylinder head of the internal combustion engine 1, and thus a large amount of condensed water is generated. For this reason, a large amount of condensed water may stagnate in the EGR valve 9. Even in this case, since the curved structure EGR path 8 slopes downwards from a position at which the EGR valve 9 is provided towards the joining section 8d side, a large amount of the condensed water having reached the EGR valve 9 is discharged to the intake manifold 3 along the slope of the curved structure EGR path 8.

In addition, if providing the head-internal EGR path 7, the overall EGR path will be compact, and ensuring the path length required between the position at which the EGR valve 9 is provided and the joining section 8d merging to the intake manifold 3 will be difficult. Even in this case, by providing the curved structure EGR path 8 as shown in FIG. 1, it is possible to adequately ensure a path length for which blow-by oil and condensed water entering the curved structure EGR path 8 from the upstream-side intake path 10 will not reach the EGR valve 9.

In addition, since the curved structure EGR path 8 does not exceed the edge line LE of the internal combustion engine 1 as shown in FIG. 4, the path length required until the EGR valve 9 is ensured, while the installation space of the internal combustion engine 1 does not increase in size.

Moreover, by the length cl of the center line of the curved structure EGR path 8 being set to at least 135 mm as shown in FIG. 4, it is possible to ensure the path length required until the EGR valve 9. For this reason, it is possible to adequately avoid the blow-by oil and condensed water entering the curved structure EGR path 8 from the upstream-side intake path 10 from reaching the EGR valve 9.

The present inventors have performed tests for confirming this effect.

Test condition: oil drip from upstream-side intake path 10

Oil amount was set to 3.6 g/hr considering worst condition.

Result: When the length cl of the center line of the curved structure EGR path 8 is 135 mm, the adherence of oil to the EGR valve 9 was not observed visually. On the other hand, with the length cl of the center line of the curved structure EGR path 8 at 95 mm and 125 mm, adherence of oil to the EGR valve 9 was observed visually.

In addition, since the curved structure EGR path 8 curves in an S-shape in the lateral cross-sectional view as shown in FIG. 1, it is possible to establish the curved structure EGR path 8 that is efficient in manufacture due to the relationship of the molding dies that remove a core, and is efficient upon forming the turned-back section 8b while achieving a path length.

As shown in FIG. 5, since the curved structure EGR path 8 and upstream-side intake path 10 merge at an acute angle in the joining section 8d, the blow-by oil entering the curved structure EGR path 8 from the upstream-side intake path 10 of the joining section 8d, if riding the flow of intake air, will not easily enter the curved structure EGR path 8 towards a substantially opposite direction to the flow of intake air. For this reason, it is possible to suppress blow-by oil from the upstream-side intake path 10 from entering the curved structure EGR path 8.

As shown in FIG. 5, the embankment section 11 that projects inwards and prevents blow-by oil from following the inner wall face from the upstream-side intake path 10 of the joining section 8d and flowing into the curved structure EGR path 8 is provided at the inner wall face of the joining section 8d. It is thereby possible to prevent blow-by oil from following the inner wall face from the upstream-side intake path 10 of the joining section 8d and flowing into the curved structure EGR path 8, by way of the embankment section 11. For this reason, the blow-by oil from the upstream-side intake path 10 can be suppressed from entering the curved structure EGR path 8.

It should be noted that the present invention is not to be limited to the aforementioned embodiment, and that various modifications thereto are possible.

For example, in the present embodiment, the curved structure EGR path 8 is S-shaped in the lateral cross-sectional view; however, it may be a curved structure having another turned back section, e.g., U-shaped or the like in the lateral cross-sectional view.

In addition, the slope downwards to the joining section 8d side of the curved structure EGR path 8 may be any angle so long as sloping uniformly.

Moreover, the upstream-side EGR path of the curved structure EGR path 8 may not necessarily be configured in the head-internal EGR path.

Furthermore, the embankment section 11 provided at the inner wall face of the joining section 8d may be another shape.

The invention claimed is:

1. An EGR device for an internal combustion engine, comprising: an EGR path that causes a portion of exhaust gas to recirculate from an exhaust path of the internal combustion engine to an intake path as EGR gas; and an EGR valve that is disposed within the EGR path and adjusts a flow rate of the EGR gas flowing through the EGR path, wherein an EGR path provided outside of the internal combustion engine from a position at which the EGR valve is disposed until a joining section merging with the intake path is a curved structure having a turned-back section that is curved in a cross-sectional view cutting a plane parallel to an installation plane on which the internal combustion engine is mounted, wherein the position at which the EGR valve is disposed is higher than the joining section, and the EGR path of the curved structure slopes downwards from a side of the EGR valve towards a side of the joining section, and wherein the EGR path of the curved structure and an upstream-side intake path merge at an acute angle at the joining section, the upstream-side intake path being arranged above an upstream side of the EGR path of the curved structure, and extending downwards towards the joining section.

2. The EGR device for an internal combustion engine according to claim 1, wherein a portion of the EGR path on an upstream side connecting with the EGR path of the curved structure is configured as a head-internal EGR path that passes through the inside of a cylinder head of the internal combustion engine.

3. The EGR device for an internal combustion engine according to claim 1, wherein the EGR path of the curved structure does not exceed an edge line of the internal combustion engine, and a length of a center line of the EGR path of the curved structure is at least 135 mm.

4. The EGR device for an internal combustion engine according to claim 1, wherein the EGR path of the curved structure is S-shaped in a cross-sectional view cutting a plane parallel to an installation plane on which the internal combustion engine is mounted.

5. The EGR device for an internal combustion engine according to claim 1, wherein an embankment section that projects inwards and prevents blow-by oil from following an inner wall face from the upstream-side intake path and flowing into the EGR path of the curved structure is provided at an inner wall face of the joining section, wherein the embankment section is formed until an end part on an intake manifold side that reaches the inner circumferential face of a side of a portion at which the upstream-side intake path and the curved structure EGR path meet at the joining section, and wherein the embankment section is formed to slope downwards from directly above a linking section, at which the upstream-side intake path is linked to the curved structure EGR path, towards the end part.

* * * * *